Jan. 31, 1961  H. M. ALLARD  2,969,818
CLAMPING MECHANISM FOR MOLDING MACHINES
Filed Nov. 28, 1958  2 Sheets-Sheet 2
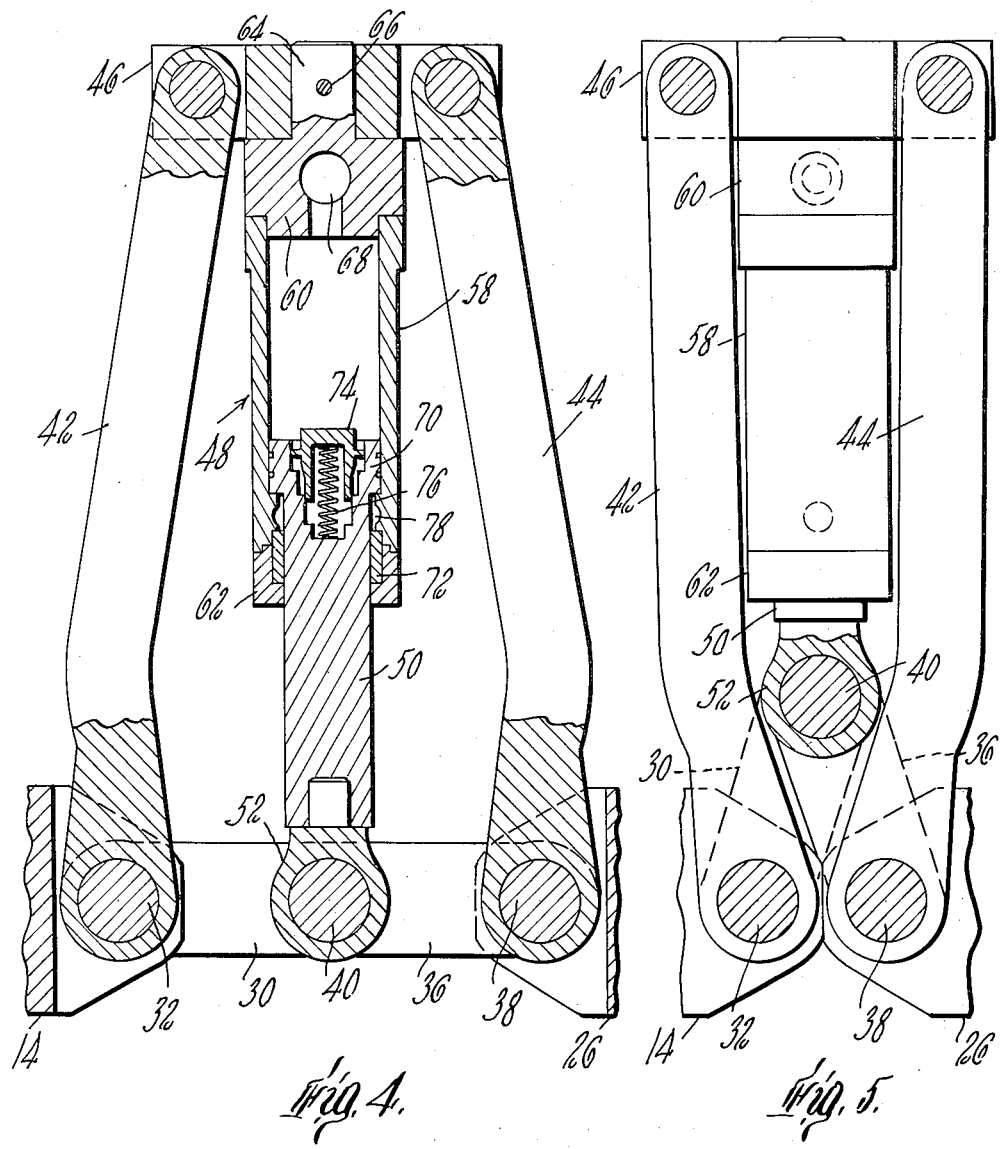
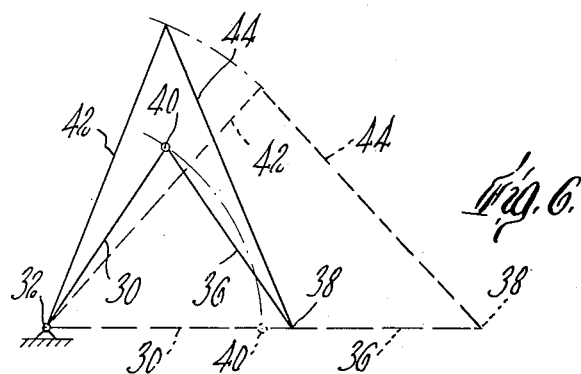

United States Patent Office 2,969,818
Patented Jan. 31, 1961

2,969,818

CLAMPING MECHANISM FOR MOLDING MACHINES

Harrie M. Allard, Nashua, N.H., assignor to Improved Machinery Inc., Nashua, N.H., a corporation of Maine Filed Nov. 28, 1958, Ser. No. 777,125

2 Claims. (Cl. 144—302)

This invention relates to improvements in force applying mechanisms and more particularly to an improved toggle mechanism structure particularly suitable for use with injection molding machines, die cast machines and the like.

Injection molding machines require associated apparatus capable of developing forces of substantial magnitude which are frequently in the order of several hundred tons. Such apparatus are utilized for clamping the molding platens together in a secure and positive manner while injecting the molding material into the molding cavity. The forms of apparatus heretofore utilized have a certain disadvantages. One type of apparatus which has been utilized in these applications includes a large hydraulic cylinder having a ram which is directly connected to and in axial alignment with the movable member to which force is to be applied. When forces of substantial magnitude are required the cylinder is of massive proportions and the quantity of fluid necessitated thereby is large. A primary difficulty which results is that the equipment requires more space than can be economically provided. In addition to the excessive space that is required a larger number of pumps and more complex control devices must be provided for handling the fluid.

To alleviate these problems, mechanical force multiplying structures, such as levers and toggle linkages, are utilized. These often are actuated by means of a hydraulic system. Although such devices permit more economical use of the available space the mounting of the prime mover, particularly in toggle linkages, must be carefully engineered. For example, the prime mover in a single toggle mechanism heretofore has been fixedly mounted and it is necessary to evaluate and to compensate for the unbalanced forces which are generated during the operation of the mechanism. The side thrust on the fixed mounting in large installations is often substantial.

Accordingly, it is a primary object of this invention to provide an improved force applying mechanism utilizing a toggle linkage in which support for the prime mover is obtained from the toggle linkage itself.

Another object of this invention is to provide improved and compact force applying mechanism particularly suitable for use with injection molding machines and the like.

Still another object of the invention is to provide a force applying apparatus including a toggle linkage comprising two links connected at the center and adapted to push outwardly in both directions from the center; a prime mover adapted to apply its force to the toggle's center point normal to its line of thrust; and a second linkage connecting the outer ends of the toggle to the prime mover and adapted to support the prime mover in a manner such that no part of the prime mover's thrust is communicated outside of the force system described.

The preferred embodiment of the invention is utilized as a clamping mechanism in an injection molding machine. The structure according to the invention includes a toggle mechanism comprised of two linkage structures which are connected together at the inner ends to form a pivotable junction. The outer end of one linkage structure is fixedly secured to the frame of the molding machine and the outer end of the other link structure is attached to the clamping mechanism. The prime mover, a hydraulic cylinder, is mechanically connected to the toggle junction and is mounted so that its force is applied to this junction in a direction perpendicular to the direction of clamping movement throughout the clamping operation. The mounting structure comprises a yoke and two support arms which are pivotably connected to the link structures. The length of the support is proportional to the link to which it is connected. This method of mounting the prime mover enables the efficient utilization of its force as it is applied to the toggle junction in a direction perpendicular to the movement of the movable member at all times during its application. In the preferred embodiment the link structures are of equal length and the support arms, which are similarly of equal length, are attached to the outer ends of the links. In this manner the available force is utilized in the most efficient manner. The support structure for the prime mover is mounted directly on the toggle linkage and thus the entire force applying apparatus is self-contained. The prime mover is not fixed in position relative to the frame of the molding machine and all the the resulting forces other than the output force are balanced within the support structure. The invention provides a compact force applying mechanism.

Other objects, features and advantages of the invention will be evident as the following description of the preferred embodiment of the invention progresses, in conjunction with the drawings, in which:

Fig. 4 is a view, in partial section of the force applying apparatus, showing the toggle mechanism, and the method of supporting the hydraulic cylinder, the apparatus being shown in fully advanced or clamping position;

Fig. 5 is a view similar to that of Fig. 4 of the force applying apparatus in fully retracted or unclamped position; and Fig. 6 is a diagram of the mechanism.

Figure 1:
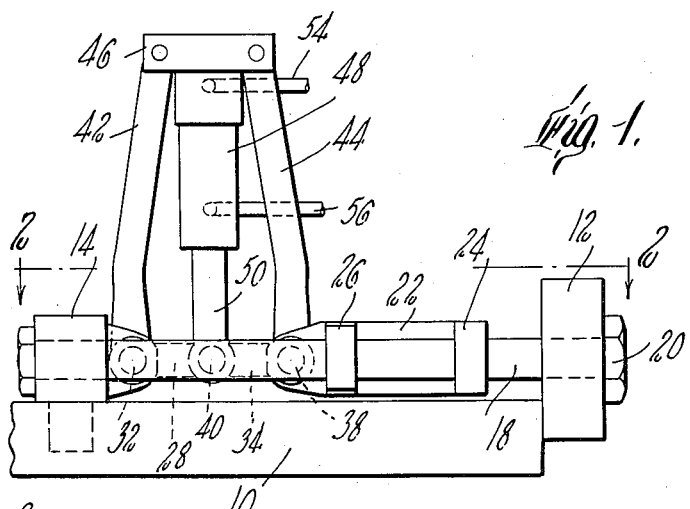
Fig. 1 is a side elevational view of the preferred embodiment, a pressure applying apparatus for a clamping mechanism associated with an injection molding machine.
Figure 2:
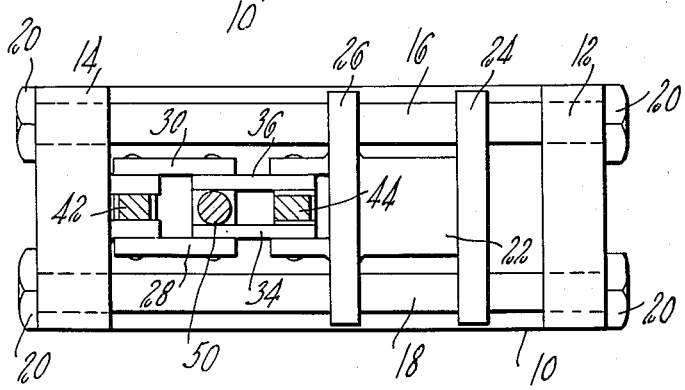
Fig. 2 is a sectional view along the line 2—2 of Fig. 1 of the apparatus of Fig. 1.
Figure 3:
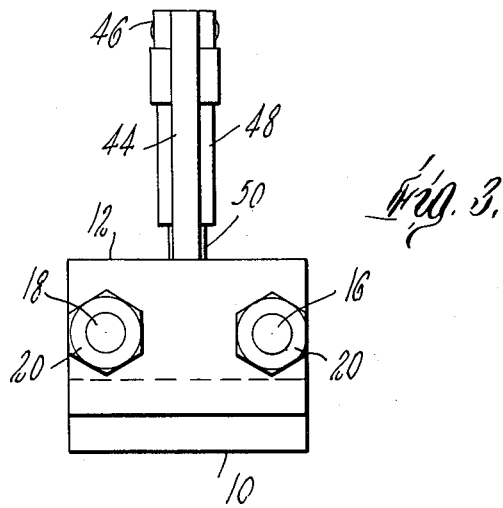
Fig. 3 is an end view of the apparatus of Fig. 1.

The clamping apparatus shown in Figs. 1–3 includes a base 10 on which a fixed platen structure 12 and a fixed tie rod supporting structure 14 are mounted. Two tie rods 16 and 18 extend between the two fixed members 12 and 14 and are secured to those members by means of nuts 20.

A movable platen having a main body portion 22, a forward mold plate 24 and a rear plate 26 rides on the tie rods. The forward mold plate 24 includes an aperture on either side thereof which contains a suitable bearing bushing for sliding cooperation with the tie rods 16 and 18. The rear movable platen plate 26 includes corresponding apertures which also cooperate with the tie rods. In this manner the movable platen is adapted for reciprocating motion on the tie rods.

A toggle mechanism is provided to reciprocate the movable platen along the tie rods. The mechanism comprises two link structures, each of which includes two links. One link structure includes links 28 and 30 which are pivotally secured to the support structure 14 by means of a pin 32 and suitable retaining members. The other link structure includes links 34 and 36 which are pivotably connected to the rear plate 26 of the movable platen by means of pin 38 and suitable retaining means. The four links are pivotably connected together at their inner ends in a junction and are secured there by a pin 40. The links are of equal length.

Attached to the pivot connections at the outer ends of the link members are identical support arms 42 and 44, arm 42 being secured by pin 32 and arm 44 being secured by pin 38. The upper ends of the arms are connected to a yoke 46 which supports a hydraulic clamping cylinder 48. The cylinder includes a piston rod or ram 50 which is connected at its lower end to the junction of the toggle linkages by pin 40 and socket 52. Lines 54 and 56, connected to the cylinder, provide conduits for fluid.

Details of the clamping mechanism may be understood with reference to Figs. 4 and 5. The cylinder 48 includes a cylindrical wall portion 58, an upper cylinder head 60 and a lower cylinder head 62, which are secured together as a unit by suitable means such as bolts (not shown). A projecting portion 64 of the cylinder head 60 is received into an aperture in the yoke 46 and attached thereto by a pin 66. The hydraulic cylinder is thus supported from this yoke. The aperture 68 and communicating passageway in the upper cylinder head are connected to line 54.

A piston 70 is mounted for reciprocating motion within the cylindrical wall 58 and includes, as an integral part, the ram 50 which passes through the lower cylinder head 62. A bushing insert 72 is provided in the head 62 as a bearing member. Positioned in a recess in the upper portion of the piston is a cushion spool 74. The spool is biased upwardly by a spring 76 and held within the recess by appropriate retaining means. This cushion spool provides a buffering action between the piston and the upper cylinder head as the piston moves upward. Fluid from line 56 is introduced into the channel 78 and acts against the lower surface of the piston to drive it upward.

The structure of the preferred embodiment is shown in clamped position in Fig. 4 and in unclamped position in Fig. 5. In clamped position the toggle linkages are parallel to and aligned with one another in end-to-end relationship with their outer ends in a straight line relationship with the pivotal junction of their inner ends in a fully extended position such that the movable point (pin 38) is at its maximum distance from the fixed point (pin 32). To reach this position, the ram 50 has been driven downwardly by the pressure of fluid above the piston. In this position the distance between the fixed platen 12 and the movable platen 24 is the minimum. In unclamped position the ram is fully retracted and the toggle junction (pin 40) is raised so that the linkages are folded with the movable platen connection member and the corresponding fixed element connection member closely adjacent to each other. The spacing between the movable platen and the fixed platen is then maximized. It is to be noted that in both positions the ram of the hydraulic cylinder is disposed perpendicularly to the tie rods. Force is applied to the junction in a direction perpendicular to the motion of the movable platen throughout its movement. The ram is maintained in its perpendicular position by the support structure consisting of yoke arms 42 and 44 pivotally secured to one another through the yoke 46 forming a pivotal junction at their inner ends. The arms are of equal dimensions and are secured to the toggle linkages at points equidistant from the toggle junction. Where the links are of unequal length this same result may be achieved by proportioning the lengths of the arms to the lengths of the corresponding links. In this embodiment one arm is secured at the fixed pivot (pin 32) and the other is secured at the movable pivot (pin 38). This connection causes the hydraulic cylinder to move to the right, in the same direction as the application of output force, and downwardly as clamping force is applied. The sketch of Fig. 6 illustrates this general movement of the mechanism.

The yoke arms preferably are connected to the horizontal yoke in order to reduce the overall height of the apparatus. In addition the arms are formed in bent configuration as indicated such that a particularly compact unit is provided.

The invention thus provides a structure in which the force applying means is supported within the mechanism with the force applied between the two junctions and fixed support points are eliminated. Certain side stresses are contained within and balanced by the mounting structure. The apparatus permits the application of force to the toggle in a direction perpendicular to the direction of the output so that certain unbalanced forces and the accompanying stresses are avoided. Thus, a compact and improved force applying structure is provided. This structure has been utilized in an injection molding machine as a mold clamping device.

While a preferred embodiment of the invention has been described it is not intended the invention be limited thereto or to all details thereof and departures may be made therefrom within the spirit and scope of the following claims.

I claim:

1. In combination with the clamping mechanism of an injection molding machine which includes a base, a fixed platen and a movable platen, a horizontally extending guide member mounted on said base for guiding said movable platen in a straight line path towards and away from said fixed platen, a force applying toggle linkage adapted to urge said movable platen toward said fixed platen for clamping, said toggle linkage comprising a pair of links pivotally connected to one another at their inner ends to form a pivotal junction, the outer end of one of said links being pivotally connected to said movable platen and the outer end of the other of said links being pivotally connected to said base, said links being disposed substantially in end-to-end aligned relationships to one another when said linkage is in fully extended position and with said outer link ends being adjacent to one another when said linkage is in folded fully retracted position, and a fluid pressure cylinder and piston structure, the piston of said structure being pivotally connected to the junction of said toggle linkage to move said junction away from said cylinder for urging said movable platen toward said fixed platen in a clamping operation, a fluid pressue cylinder support structure comprising two support arms, each arm being pivotally connected to the outer end of one of said toggle links and being pivotally connected to the fluid pressure cylinder, said arms being disposed substantially parallel to one another on either side of said cylinder when said toggle linkage is in fully retracted position, thereby insuring application of force to said junction in a direction perpendicular to the direction of force applied by said linkage to said movable platen.

2. In combination with the clamping mechanism of an injection molding machine which includes a base, a fixed platen, a movable platen and guide means on said base for guiding motion of said movable platen in a straight line path towards and away from said fixed platen, a force applying toggle linkage adapted to urge said movable platen toward said fixed platen for clamping, said toggle linkage comprising a pair of links pivotally connected to one another at their inner ends to form a pivotal junction, the outer end of one of said links being pivotally connected to said movable platen and the outer end of the other of said links being pivotally connected to said base, said links being disposed substantially in end-to-end aligned relationship to one another when said linkage is in fully extended position and with said outer link ends being adjacent to one another when said linkage is in folded fully retracted position, support means comprising two support arms of substantially greater length than said links and pivotally interconnected at their inner ends to form a pivotal junction laterally spaced from the pivotal junction of said links, each arm being pivotally connected at its outer end to the outer end of an associated toggle link and expanding and contracting means for applying force interconnecting the junctions of said toggle links and said support arms to move said junctions away from one another and toward one another for urging said movable platen towards and away from said fixed platen respectively, said support arms being disposed on either side of said means for applying force, thereby insuring application of forces between said junctions in a direction perpendicular to the direction of force applied by said linkage to said movable platen.

References Cited in the file of this patent

UNITED STATES PATENTS

| | | |
|---|---|---|
| 500,184 | Beers | June 27, 1893 |
| 527,790 | Heggem | Oct. 23, 1894 |
| 1,416,970 | Olson | May 23, 1933 |
| 1,796,763 | Paterson | Mar. 17, 1931 |
| 2,165,614 | Cook et al. | July 11, 1939 |
| 2,757,554 | Niedhammer et al. | Aug. 7, 1956 |